Jan. 13, 1953 S. F. ESKEW 2,625,165
PROTECTIVE CANOPY FOR TRAVEL KITCHENS
Filed Oct. 31, 1950 2 SHEETS—SHEET 1
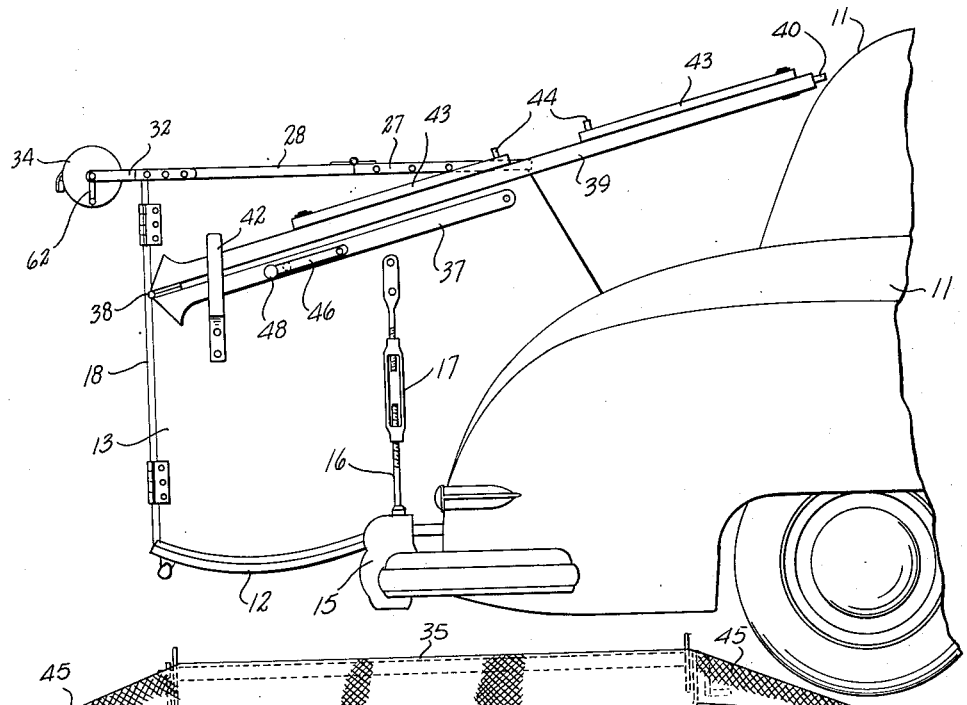
INVENTOR.
STANLEY F. ESKEW,
BY
McMorrow, Berman + Davidson
ATTORNEYS.

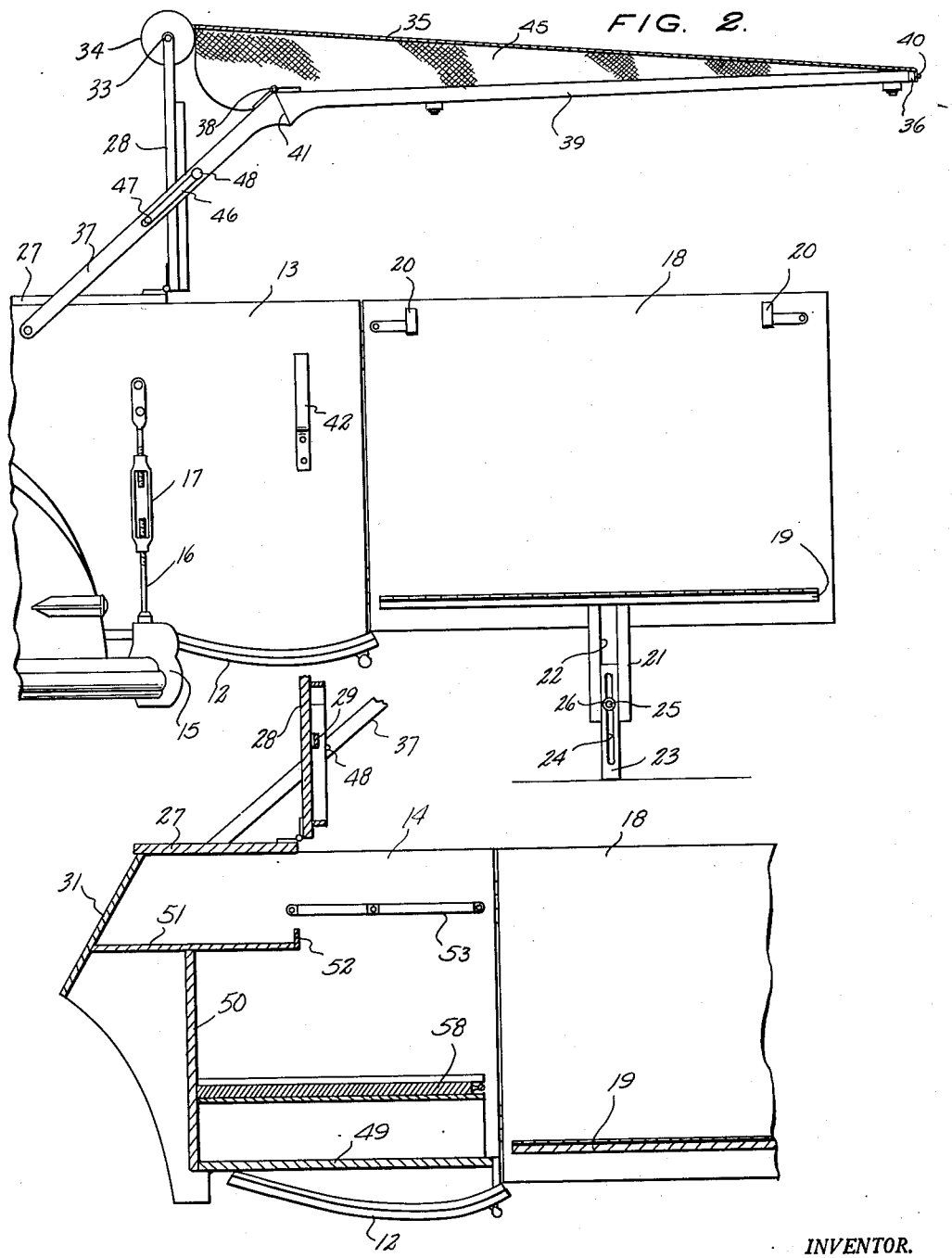

Patented Jan. 13, 1953

2,625,165

UNITED STATES PATENT OFFICE 2,625,165

PROTECTIVE CANOPY FOR TRAVEL KITCHENS

Stanley F. Eskew, Fayetteville, W. Va.

Application October 31, 1950, Serial No. 193,174

4 Claims. (Cl. 135—5)

This invention relates to portable kitchens, and more particularly to improved canopy structure for a camp kitchen adapted to be mounted on and to be carried by an automobile.

A main object of the invention is to provide a novel and improved canopy for a portable camp kitchen for attachment to a conventional automobile body, said canopy involving simple structure, being easy to install on an automobile, and providing complete protective coverage for cooking facilities.

A further object of the invention is to provide an improved canopy for a portable camp kitchen adapted to be carried by the rear portion of a conventional automobile body, the canopy being inexpensive to construct, providing protection for all the necessary equipment for cooking, being very compact in size, and providing coverage for all necessary facilities for outdoor cooking and dining.

Further objects and advantages of the invention will become apparent from the following description and claims, and from the accompanying drawings, wherein:

Figure 1 is a side elevational view of an improved camp kitchen outfit mounted in the rear portion of a passenger automobile, the camp kitchen being shown in completely folded and housed condition;

Figure 2 is a side elevational view of the camp kitchen outfit of Figure 1 in open condition set up for use, the canopy portion of the kitchen being shown in longitudinal cross-section;

Figure 3 is a rear elevational view of the camp kitchen of Figures 1 and 2, the kitchen being shown set up for use;

Figure 4 is a cross-sectional detail view taken on line 4—4 of Figure 3.

Referring to the drawings, 11 designates a conventional automobile, shown by way of example as an automobile of the "Kaiser Traveler" type. This type of automobile body has a rear trunk compartment provided with a horizontally hinged door 12 which is swingable downwardly to a horizontal, upwardly facing, open position, as shown in Figures 1, 2 and 4. Designated at 13 and 14 are respective side walls of any suitable rigid material, such as plywood or the like, said walls being parallel and extending substantially longitudinally. The lower margins of the side walls 13 and 14 are shaped to fit the curvatures of the cover 12 and the rear portion of the car body, so as to make a close fit with said parts. Each side wall is secured to the bumper guard 15 located outwardly thereof by an adjustable link member 16 which includes a turnbuckle 17.

Designated at 18 is a rear wall hinged to the vertical rear end margin of the side wall 14 and defining a rear closure with respect to the side walls 13 and 14 and the trunk compartment cover 12. The rear wall 18 is swingable outwardly to a position extending longitudinally with respect to the automobile body, as shown in Figure 2, and is provided with a hinged table board 19 on its inner side. The table board 19 is engageable beneath respective pivoted clip members 20, 20 provided at the upper corner portions of the swingable rear wall 18, said clip members 20, 20 being engageable with the free margin of the table board 19 to retain said table board in an upwardly folded position adjacent to the rear surface of the wall 18. By elevating the pivoted clip members 20, 20, said clip members may be disengaged from the margin of the table board 19, allowing the table board to be swung downwardly to a horizontal position, as shown in Figures 2 and 3. Hinged to the inside surface of the table board 19, said inside surface being the bottom surface of the table board when it is in its horizontal position, is a depending, extensible supporting leg 21. Said supporting leg is provided with a groove 22 in which is slidably positioned an extension member 23, said extension member being formed with a longitudinal slot 24 which receives the shank of a bolt 25 on which is threaded a suitable fastening nut 26. It will be readily apparent that the extension 23 may be set in any desired position and locked by means of the fastening nut 26. Therefore, the depending leg 21 is adapted to support the table board 19 in a horizontal position by adjusting the extension 23 to ground-engaging position.

Secured to the top margins of the side walls 13 and 14 is a fixed top wall section 27, and hinged to the edge of said top wall section 27 is a movable top wall section 28. The inside surface of the top wall section 28 is provided with the flexible strap member 29 which is secured to the inside surface of the section 28 at spaced intervals to define loop portions 30 to accommodate silverware and cutlery. The material of the strap member 29 is preferably elastic, so that said cutlery and silverware will be elastically retained in the loop portions 30.

Designated at 31 is a transversely extending wall section which defines a front closure of the housing above described.

Secured to the side edges of the hinged top wall section 28 adjacent the rear margin thereof are the outwardly projecting bracket members 32 in which is rotatably journaled a transverse shaft 33. Secured on said shaft is a reel 34 to which is secured a body of flexible material 35 adapted to be unreeled to define a protective canopy for the area rearwardly adjacent to the automobile. Secured to the free transverse margin of the body 35 is a bar member 36. Pivoted to the side walls 13 and 14 are respective arms 37 which have hinged thereto at 38 the respective extensions 39. Each extension 39 is provided at its end with a pin 40 engageable through an opening in the bar member 36 to maintain the flexible member 35 in an outwardly extending, stretched position, as shown in Figure 2. As shown in Figure 2, the adjacent ends of the members 37 and 39 are adapted to abut at 41 to prevent member 39 from folding clockwise toward member 37, as viewed in Figure 2, beyond the limiting position shown in Figure 2, but to allow the member 39 to be rotated counterclockwise to fold to a position parallel to member 37 at times, as shown in Figure 1. The side walls 13 and 14 are provided with respective hook-like brackets 42 adapted to receive the folded members 39 and 37 in the manner shown in Figure 1. Pivoted to each member 39 are a pair of outwardly extensible arms 43, 43 provided with projections at their free ends, shown at 44, which are adapted to engage in grommets provided in respective laterally extensible wing sections 45, 45 provided on the canopy body 35.

Designated at 46 are respective resilient arms secured to the arms 37 at 47 and having headed pin portions 48 which normally project through apertures in the arms 37 and are engageable behind the upstanding top wall section 28 to retain said top wall section in its upstanding vertical position, as shown in Figure 4. To release the upstanding top wall section 28, it is merely necessary to pull outwardly on the heads of the pin members 48, whereby the arms 46 yield and allow the shank portions of the pin members 48 to be disengaged from the section 28.

Designated at 49 is a horizontal platform provided inside the compartment above the sides, and designated at 50 is a transverse vertical panel secured inside the housing. Secured between the side walls 14 and 13 on the top edge of the transverse panel 50 is the horizontal shelf 51. Said shelf is provided at its edge with the upstanding flange 52, whereby the shelf may be employed to store food articles, utensils, and the like. Secured to the inside surfaces of the side walls 13 and 14 are elastic bands or straps 53 which are arranged to define retaining loops for kitchen utensils, such as pots and pans. Secured on the platform 49 at one side of the compartment are the upstanding wall sections 54, 55, and connecting the upper portions of said wall sections is a horizontal panel 56. Secured on the side portions of the panel 56 are the respective opposed, inwardly facing angle bars 57, 57 in which are slidably received a tray member 58. As shown in Figure 3, the tray member 58 rests on the panel 56 and is guided for longitudinal sliding movement by the opposing angle bars 57, 57.

As shown in Figure 3, a portable refrigerator 59 may be mounted in the space at the side of the compartment opposite to the tray member 58, and a portable gasoline stove 60 may be supported on the structure which carries said tray member. Space is provided between the stove 60 and the refrigerator 59 for storing a container 61 for fuel for the stove 60. The space beneath the tray member 58 is suitable for storing utensils, such as pots and pans, or other items of kitchen equipment. The gasoline stove 60 may be supported on the sliding tray 58 so that the stove may be drawn outwardly for convenience in cooking.

One end of the shaft 33 is provided with a hand crank 62 for rotating the shaft when it is desired to roll up the flexible body 35, when dismantling the kitchen. Attached to the bar 36 are the securing straps 63, 63 adapted to be engaged around the rolled-up flexible member 35 and provided with suitable buckles for fastening same.

While a specific embodiment of an improved travel kitchen structure for use on automobiles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an automobile of the type having a rear trunk compartment provided with a horizontally hinged door swingable downwardly to a horizontal upwardly facing open position, a pair of parallel vertical side walls secured to the frame of the automobile and supported on said door in its open position, a top wall secured to the top edges of said side walls, said top wall including an upwardly swingable, transversely extending hinged section, a transverse reel rotatably secured to the free transverse margin of said section, a flexible body of material wound on said reel and being adapted to define a canopy when unwound from the reel, and respective supports swingably secured to said side walls, said supports being engageable with said body of flexible material and being arranged to maintain said body of flexible material in protective overlying relation to the area outwardly adjacent the automobile.

2. In an automobile of the type having a rear trunk compartment provided with a horizontally hinged door swingable downwardly to a horizontal upwardly facing open position, a pair of parallel vertical side walls secured to the frame of the automobile and supported on said door in its open position, a top wall secured to the top edges of said side walls, said top wall including an upwardly swingable, transversely extending hinged section, a transverse reel rotatably secured to the free transverse margin of said section, a flexible body of material wound on said reel and being adapted to define a canopy when unwound from the reel, respective foldable supports swingably secured to said side walls, said supports being engageable with said body of flexible material and being arranged to maintain said body of flexible material in protective overlying relation to the area rearwardly adjacent the automobile, and a plurality of outwardly extensible arms pivoted to each support arranged to support marginal portions of said body of flexible material.

3. In an automobile of the type having a rear trunk compartment provided with a horizontally hinged door swingable downwardly to a horizontal upwardly facing open position, a pair of parallel vertical side walls secured to the frame of the automobile and supported on said door in its open position, a top wall secured to the top edges of said side walls, said top wall including an upwardly swingable, transversely extending hinged section, a transverse reel rotatably secured to the free transverse margin of said section, a flexible body of material wound on said reel and being adapted to define a canopy when unwound from the reel, respective foldable supports swingably secured to said side walls, said side walls being provided with respective brackets in which said supports are at times receivable, said supports being engageable with the body of flexible material and being arranged to maintain said body of flexible material in protective overlying relation to the area rearwardly adjacent the automobile, and a plurality of outwardly extensible arms pivoted to each support and arranged to support marginal portions of said body of flexible material.

4. In an automobile, a pair of parallel vertical side walls secured to the frame of the automobile at its rear portion, a top wall secured to the top edges of said side walls, said top wall including an upwardly swingable, transversely extending hinged section, a transverse reel rotatably secured to the free transverse margin of said section, a flexible body of material wound on said reel and being adapted to define a canopy when unwound from the reel, and respective movable supporting means connected to said side walls, said supporting means being engageable with said body of flexible material and being arranged to maintain said body of flexible material in protective overlying relation to the area rearwardly adjacent to the automobile.

STANLEY F. ESKEW.

No references cited.